United States Patent [19]

Pelfrey

[11] Patent Number: 5,259,483
[45] Date of Patent: Nov. 9, 1993

[54] LOW PROFILE DISK BRAKE CALIPER

[76] Inventor: Rick D. Pelfrey, 7700 New Carlisle Pike, Huber Heights, Ohio 45424

[21] Appl. No.: 834,868

[22] Filed: Feb. 13, 1992

[51] Int. Cl.$^5$ ............................................. F16D 55/18
[52] U.S. Cl. ...................................... 188/71.1; 188/17;
188/18 A; 188/24.22; 188/72.4; 188/73.1;
188/73.46; 188/250 G; 188/370; 188/26;
188/344
[58] Field of Search .............. 188/71.1, 24.11, 24.22,
188/24.12, 26, 17, 18 A, 18 R, 73.1, 72.4, 72.5,
2 D, 72.6, 72.9, 73.32, 73.46, 106 F, 370, 250 B,
250 G, 234, 344, 367, 366, 369, 153 D

[56] References Cited

U.S. PATENT DOCUMENTS

| | | |
|---|---|---|
| 2,612,968 | 10/1952 | Hood . |
| 3,062,329 | 11/1962 | Erickson . |
| 3,628,635 | 12/1971 | Yoshigai . |
| 3,776,333 | 12/1973 | Mathauser .......................... 188/344 |
| 3,878,921 | 4/1975 | Kibler et al. ........................ 188/26 |
| 3,899,049 | 8/1975 | Martin . |
| 3,935,930 | 2/1976 | Kine .................................. 188/344 |
| 3,949,838 | 4/1976 | Fuhrman ............................ 188/26 |
| 3,971,457 | 7/1976 | Campagnolo . |
| 3,989,124 | 11/1976 | Fujii .................................. 188/26 |
| 3,995,723 | 12/1976 | Holcomb, Jr. .................... 188/72.4 |
| 4,042,072 | 8/1977 | Baba ................................. 188/370 X |
| 4,215,768 | 8/1980 | Seki . |
| 4,391,353 | 7/1983 | Mathauser ..................... 188/24.22 X |
| 4,585,094 | 4/1986 | Rottenkolber et al. .......... 188/24.22 |
| 4,632,225 | 12/1986 | Mathauser ....................... 188/344 X |
| 4,665,803 | 5/1987 | Mathauser ....................... 188/344 X |
| 4,842,102 | 6/1989 | Tateyama et al. ................ 188/26 X |
| 5,078,456 | 1/1992 | Cox .................................. 303/89 |

FOREIGN PATENT DOCUMENTS

| | | | |
|---|---|---|---|
| 1196309 | 5/1958 | France ............................... 188/370 |
| 0035122 | 2/1987 | Japan ............................... 188/72.4 |
| 1-79431 | 3/1989 | Japan . |
| 0128786 | 5/1991 | Japan ............................... 188/72.5 |
| 1096596 | 12/1967 | United Kingdom ............... 188/72.4 |

Primary Examiner—Douglas C. Butler
Attorney, Agent, or Firm—Thompson, Hine and Flory

[57] ABSTRACT

A low profile disk brake caliper in which a disk brake pad is mounted on a flexible diaphragm contained within a piston cavity. Pressurization of the piston cavity by a master cylinder expands the diaphragm and urges the brake pad sidewardly from the housing to engage an adjacent rotor. In the preferred embodiment, the diaphragm is received within a cap seal slidably mounted within the cavity, and the brake pad is mounted removably within a pad carrier attached to the cap. A backing seal is positioned adjacent to the underside of the top wall of the diaphragm and is clamped against the cap by assembly bolts, so that the top wall of the diaphragm is compressed between the cap and backing seal, thereby preventing the top wall from bulging outwardly when the cavity is pressurized. The housing is mounted on the hub of a bicycle front wheel and includes a set screw positioned for camming engagement against the front fork to prevent rotation of the brake caliper relative to the fork. Alternately, the housing includes a torque arm attached to the front fork.

19 Claims, 3 Drawing Sheets

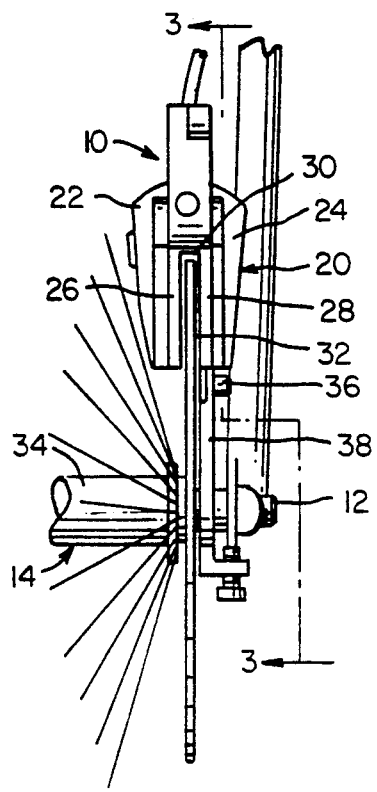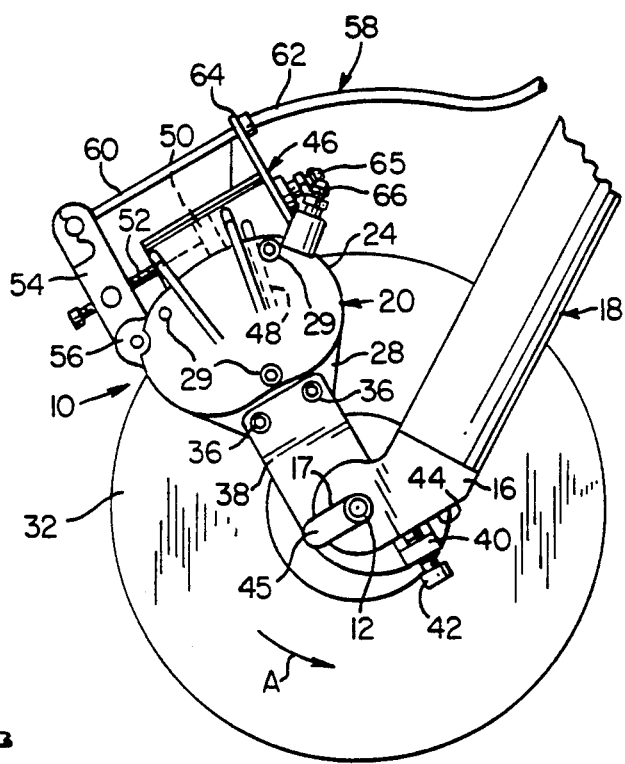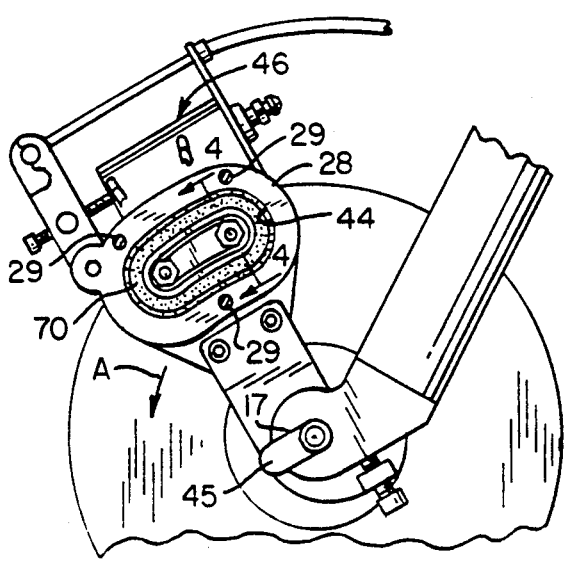

LOW PROFILE DISK BRAKE CALIPER

BACKGROUND OF THE INVENTION

The present invention relates to disk brakes and, more particularly, to disk brake calipers for lightweight vehicles such as bicycles.

Due to the superior characteristics of disk brakes with respect to simplicity of design, ease of repair, resistance to fading and long life, it is desirable to mount disk brakes on smaller vehicles such as bicycles. However, a disadvantage with conventional disk brake designs is that the disk brake pads are mounted on solid pistons which are slidably retained within cylindrical cavities formed in the calipers which include return springs that urge the pistons sidewardly to disengage the attached pads with the associated rotor when the cylinders are depressurized. Such structure adds to the overall weight and expense of the bicycle and presents a relatively high profile for a device which is mounted at or on the hub of a bicycle wheel.

Attempts have been made to design a low profile disk brake, such as that disclosed in Campagnolo U.S. Pat. No. 3,971,457. That patent discloses a wheel hub disk brake in which the wheel hub of a bicycle or motorcycle includes an inner, rotating segment attached to the wheel and positioned between two outer, non-rotating segments. The non-rotating segments are urged inwardly by ring pistons to bring ring disks into engagement with corresponding metal disks mounted on the rotating, inner hub to prevent relative rotation of the inner hub with respect to the outer hub segments in order to brake the wheel.

A disadvantage with such structure is that the hub design and ring pistons are relatively complex, requiring high tolerances and expensive castings. Further, while the structure may provide a strong braking force, the amount of metal required is relatively substantial, making such a hub unsuitable for lightweight bicycles. Accordingly, there is a need for a low profile disk brake caliper which is suitable for mounting on a bicycle wheel.

SUMMARY OF THE INVENTION

The present invention is a low profile disk brake caliper suitable for mounting on the wheel of a bicycle. The caliper includes a housing having a piston cavity, a flexible diaphragm mounted within the cavity, a brake pad mounted on the diaphragm and a master cylinder for selectively pressurizing the cavity. When the cavity is pressurized, the diaphragm expands within the cavity and urges the brake pad against an adjacent rotor to provide the braking force. Accordingly, the disk brake caliper of the present invention eliminates the need for solid pistons and return springs. The flexible diaphragm moves within the cavity to displace the brake pad, and the inherent resilience of the diaphragm, which preferably is made of rubber, provides the force necessary to return the diaphragm to its original shape and disengage the brake pad when the cavity is depressurized.

A seal cap is provided which receives the diaphragm and provides an interface between the diaphragm and both the sidewalls of the cavity and the brake pad. Consequently, when the cavity is pressurized and the diaphragm expands, the seal cap is displaced within the cavity outwardly with the brake pad, and it returns within the cavity when the brake caliper is depressurized. A backing plate is provided which is attached to the underside of the top wall of the diaphragm, so that the diaphragm top wall is clamped between the backing plate and the seal cap. This clamping engagement prevents the top wall from becoming convex when the diaphragm is pressurized. The seal cap, backing plate and brake pad carrier are all retained by assembly bolts, which pass through these components, as well as the diaphragm top wall.

The housing of the brake caliper of the present invention includes a base having a recess shaped to receive a peripheral flange formed on the diaphragm, and a cavity block, bolted to the base and having the cavity which receives the diaphragm. When the cavity block is bolted to the base, the diaphragm flange is clamped between these components and held within the base recess. In a preferred embodiment, the peripheral flange includes a rib which is received within corresponding slots formed in the cavity block.

The compactness of the unit is enhanced by providing a master cylinder which is integral with the housing. The housing includes internal channels which interconnect the master cylinder and diaphragm cavity, thereby eliminating the need for hydraulic hoses. The master cylinder is actuated by a push pull cable which is hand operated.

Also in the preferred embodiment, the caliper housing includes a pair of opposing brake pads, each mounted on a diaphragm connected to the master cylinder. Thus, the rotor is clamped between two pads to provide braking action.

The housing includes a mounting bracket having a set screw and a boss, which engage the drop out and drop out slot, respectively, to prevent rotation of the caliper during braking. Alternately, the bracket includes a torque arm attached to the fork.

Accordingly, it is an object of the present invention to provide a disk brake caliper which has a relatively low profile and is suitable for mounting on a bicycle wheel hub; a disk brake caliper in which a flexible diaphragm replaces the solid piston and return spring of conventional disk brake calipers; a disk brake caliper in which the master cylinder is integral with the caliper housing and employs internal passages to convey hydraulic fluid from the master cylinder to the diaphragms; and a disk brake caliper which is relatively inexpensive to fabricate, is relatively easy to attach to a bicycle wheel or remove from a bicycle wheel for maintenance or repair and has a relatively simple construction.

Other objects and advantages will be apparent from the following description, the accompanying drawings and the appended claims.

BRIEF DESCRIPTION OF THE DRAWING

FIG. 1 is a front elevational view of the low profile disk brake caliper of the present invention, shown mounted on the front fork of a bicycle and engaging a rotor mounted on the wheel hub;

FIG. 2 is a side elevation of the caliper of FIG. 1;

FIG. 3 is the side elevation of FIG. 2 in which the base housing plate has been removed;

DETAILED DESCRIPTION

Figure 4:
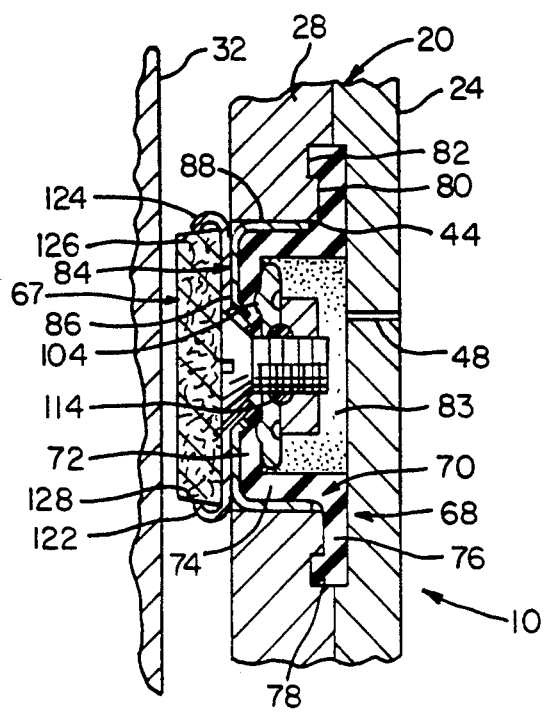
FIG. 4 is a side elevation in section taken at line 4—4 of FIG. 3.

As shown in FIGS. 1 and 2, the low profile disk brake caliper, generally designated 10, is mounted on the hub 12 of a bicycle front wheel 14 and engages a drop out 16, having slot 17, of the front fork 18. The caliper 10 includes a housing, generally designated 20 which includes left and right base plates 22, 24, each attached to a cavity plate 26, 28 by screws 29. The cavity plates 26, 28 are spaced apart to define a gap 30 shaped to receive a rotor 32 which is mounted on and rotates with the axle 34 of the wheel 14.

The housing 20 is attached by bolts 36 to a mounting bracket 38 that receives the hub 12 therethrough and includes a boss 40 having a bolt 42 therethrough which engages a flat 44 formed on the drop out 16. A boss 45 on bracket 38 fits within slot 17. The engagement of the boss 45 and slot 17, as well as bolt 42 and flat 44, prevents the rotation of the caliper 10 relative to the front fork 18 when the caliper engages the rotor 32.

As shown in FIGS. 2 and 3, cavity plate 28 includes a piston cavity 44 which communicates with a master cylinder 46 by a passage 48 which is internal to the base plate 24. Master cylinder 46 includes a piston 50 which is actuated by a threaded rod 52 pivotally attached to a lever 54 that, in turn, is mounted on a pivot 56 attached to the cavity plate 28. A push-pull cable 58 includes a control wire 60 which is attached to the lever 54. The sheath 62 is attached to a bracket 64 which projects upwardly from the master cylinder 46.

Accordingly, actuation of the push-pull cable 58 causes the piston 50 to be displaced within the master cylinder 46, thereby forcing hydraulic fluid through the passageway 48 to the piston cavity 44. The master cylinder 46 is charged through nipple 65, and cylinder 44 is bled through nipple 66. It is to be understood that the construction of the corresponding piston cavity in left cavity plate 26 and left base plate 22 is identical, but is of reverse hand.

Figure 5:
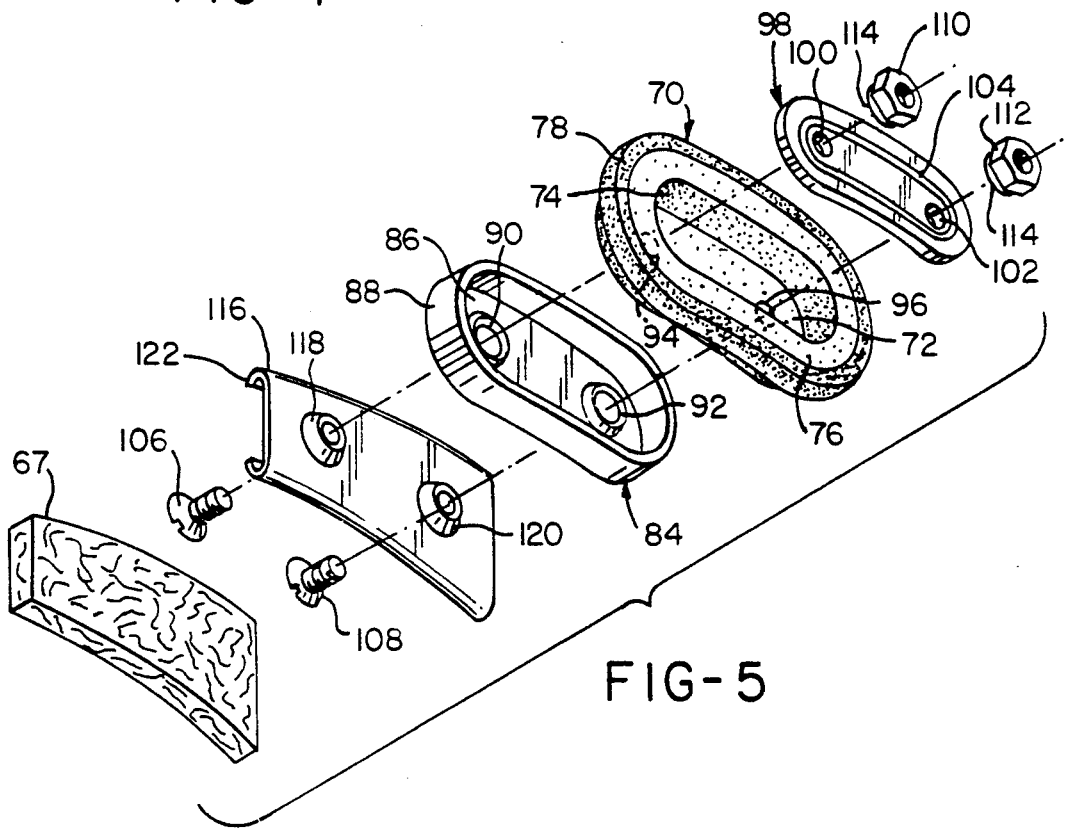
FIG. 5 is a detail showing an explode, perspective view of the brake pad and diaphragm assembly of the caliper of FIG. 1.

As shown in FIGS. 4 and 5, the caliper 10 includes a disk brake pad 67 and a diaphragm assembly, generally designated 68. The diaphragm assembly includes a flexible diaphragm 70, preferably made of rubber, which is mounted within the piston cavity 44. The diaphragm 70 preferably is kidney-shaped, as is the cavity 44 within which it is mounted (see also FIG. 3). The diaphragm includes a top wall 72, a sidewall 74 and a peripheral bottom flange 76 extending about the entire periphery of the diaphragm and which includes a rib 78 about its outer periphery.

The cavity plate 28 includes a recess 80 having a peripheral slot 82. The peripheral slot 82 receives the rib 78 of the diaphragm 70 and the recess 80 receives the peripheral flange 76. When the cavity plate 28 is bolted to the corresponding base plate 24, the flange 76 is clamped between the base plate and cavity plate, and is prevented from creeping out of that engagement by the engagement of the rib 78 with slot 82. Consequently, the diaphragm 70 creates a chamber 84 within the piston cavity which receives hydraulic fluid through passage 48 from the master cylinder 26 (see FIG. 2).

The diaphragm 70 is received within a cap seal 84 having a top wall 86 and a sidewall 88 which corresponds in shape to the kidney shape of the cavity 44. The top wall contains two bevelled holes 90, 92 which are in registry with holes 94, 96 formed in the diaphragm 70. A backing plate 98 is fitted underneath the top wall 72 of the diaphragm 70 and includes holes 100, 102 which are in registry with holes 94, 96, respectively, of the diaphragm. The backing plate 98 also includes a rib 104 which projects upwardly into the diaphragm top wall 72.

The diaphragm 70 is retained within the seal cap 84 by the clamping engagement provided by the seal plate 98. This clamping engagement is secured by assembly screws 106, 108 which are retained by nuts 110, 112. Thread seals 114 are provided to prevent leakage of hydraulic fluid from the chamber 83 through the diaphragm holes 94, 96.

The brake pad 67 is retained on a pad carrier plate 116 which has chamfered holes 118, 120 shaped to receive screws 106, 108. As best shown in FIG. 4, the pad carrier 106 has side slots 122, 124 which receive the bevelled lateral edges 126, 128 of the brake pad 66 in a locking engagement. The side slots 122, 124 are tapered in spacing, corresponding to the tapered width of the brake pad 67, so that the pad is held in locking engagement with the slots. The pad 67 is oriented on the caliper 10 so that it is driven into the narrow end of the carrier plate 116 when the pad is urged into braking engagement with a rotating rotor.

The operation of the caliper 10 is as follows. When the wheel 14 is rotating in a forward direction, the rotor 32 rotates in the direction of arrows A in FIGS. 2 and 3. When it is desired to brake the wheel, the push-pull cable 58 is actuated to displace the lever 54 inwardly toward the master cylinder 46, thereby displacing piston 50 to drive hydraulic fluid through passageway 48 into the piston cavity 44 of the cavity plates 26, 28. This pressurizes the chambers 82 formed by the flexible diaphragms 70, elastically elongating the sidewalls 74 of the diaphragms, thereby urging the brake pads 66 sidewardly away from the housings 20 and into the caliper 32. When it is desired to release the caliper 32 from the clamping engagement from pads 66, the cable 58 is actuated to displace the lever 54 outwardly, thereby drawing hydraulic fluid back into the master cylinder 46. This, plus the resiliency of the diaphragm 74 causes the brake pad 66 to be withdrawn sidewardly toward the housing 20.

It should be noted that the seal cap 88 reduces the frictional resistance of movement of the diaphragm 70 with respect to the cavity wall 44. The cap seal 84 preferably is made of stainless steel or other metal which will slide against the metal of the cavity wall more easily of the rubber of the diaphragm 70. The rib 104 urges the top wall 72 of the diaphragm 70 against the top wall 86 of the cap seal 84 and thereby provides a seal which prevents leakage of hydraulic fluid through the holes 94, 96.

Figure 6:
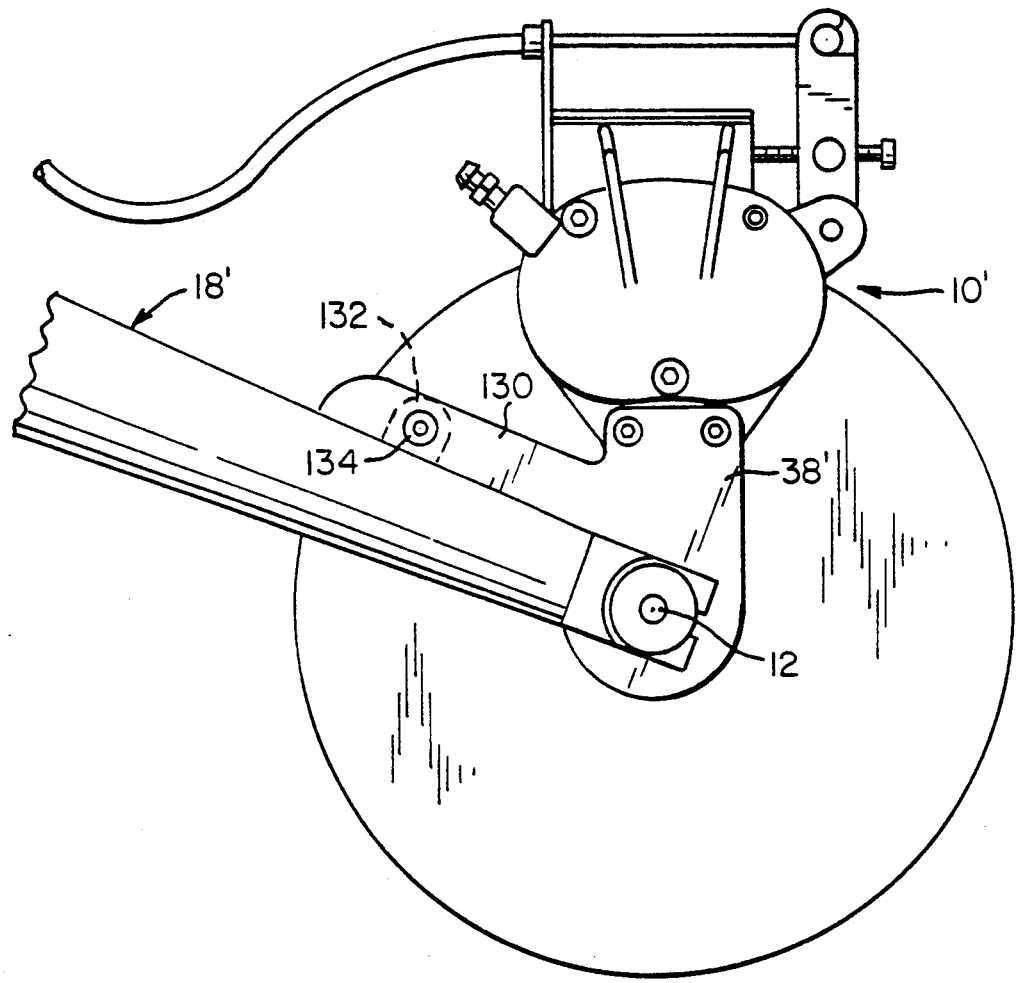
FIG. 6 is a side elevation of an alternate embodiment of the present invention.

FIG. 6 shows an alternate embodiment of the caliper 10' in which the bracket 38' torque arm 130 which is attached to a boss 132 by nut and bolt combination 134. Boss 132 is permanently attached to front fork 18'. Consequently, the engagement of torque arm 130 and boss 132 prevents rotation of caliper 10' about hub 12 during braking, and provides greater leverage than the attachment mechanism shown in FIG. 1.

While the form of apparatus herein described constitutes a preferred embodiment of the invention, it is to be understood that the invention is not limited to this precise form of apparatus, and that changes may be made therein without departing from the scope of the invention.

What is claimed is:

1. A low profile disk brake caliper comprising:
a housing having a first piston cavity;
first diaphragm means mounted within said first piston cavity;
said first diaphragm means includes cap means slidably mounted within said first piston cavity, and a support plate opposite said cap means;
first brake pad means mounted on said first diaphragm means for engaging a rotor; and
means for pressurizing said first piston cavity with a fluid whereby said first diaphragm means expands within said first piston cavity such that said first brake pad means is displaced toward said rotor.

2. The caliper of claim 1 wherein said cavity includes a lateral wall; and said cap means abuts said wall, whereby friction between said diaphragm means and said wall is reduced.

3. The caliper of claim 2 wherein said cap means includes a top wall positioned between said diaphragm means and said pad means, whereby a top surface of said diaphragm means is maintained substantially flat when said cavity is pressurized.

4. The caliper of claim 3 wherein said support plate is mounted within said cavity and abuts said top surface opposite said top wall; and includes means for clamping said top wall and said support plate against said top surface.

5. The caliper of claim 4 wherein brake pad means includes a pad retainer plate mounted on said cap means.

6. The caliper of claim 5 wherein said clamping means clamps said pad retainer plate, said cap means, said diaphragm top surface and said support plate together.

7. The caliper of claim 6 wherein said clamping means includes bolt means.

8. The caliper of claim 1 wherein said diaphragm means is sufficiently resilient to contract within said cavity when said cavity is depressurized, whereby said brake pad means is displaced away from said rotor.

9. The caliper of claim 1 wherein said diaphragm means includes a peripheral flange, and said housing includes means for engaging said flange in a fluid-tight fit.

10. The caliper of claim 9 wherein said flange includes a peripheral rib.

11. The caliper of claim 10 wherein said housing includes a base having a first recess shaped to receive said flange; and a cavity block having said cavity and a second recess, in registry with said first recess, including a peripheral slot shaped to receive said rib.

12. The caliper of claim 1 wherein said pressurizing means includes a master cylinder in fluid communication with said piston cavity, and means for actuating said master cylinder; said master cylinder being integral with said housing.

13. The caliper of claim 12 wherein said actuating means includes a push-pull cable.

14. The caliper of claim 1 wherein said housing includes means for attachment to a bicycle front fork.

15. The caliper of claim 14 wherein said attachment means includes mounting bracket means for attachment of said caliper to a bicycle wheel hub.

16. The caliper of claim 15 wherein said mounting bracket includes antirotation screw means for engaging said front fork.

17. The caliper of claim 15 wherein said mounting bracket means includes torque arm means, attached to an associated front fork, for preventing rotation of said caliper relative to said associated front fork during braking.

18. The caliper of claim 1 further comprising:
said housing having a second piston cavity opposing said first piston cavity and spaced therefrom to allow said rotor to pass therebetween, said second piston cavity communicating with said pressurizing means;
second diaphragm means mounted within said second piston cavity; and
second brake pad means mounted on said second diaphragm means for engaging said rotor, whereby pressurization of said first piston cavity and said second piston cavity causes said first diaphragm means and said second diaphragm means to expand and urge said first brake pad means and said second brake pad means into opposing clamping engagement with said rotor.

19. A low profile disk brake caliper comprising:
a housing having a piston cavity;
means for mounting said housing on a bicycle wheel hub;
diaphragm means mounted within said cavity;
cap means, slidably mounted in said piston cavity, for receiving said diaphragm means;
plate means for supporting said diaphragm means mounted within said cavity adjacent said diaphragm means opposite said cap means;
brake pad means mounted on said cap means; and
means for selectively pressurizing said cavity, whereby said diaphragm means is expanded, thereby urging said brake pad means sidewardly against an adjacent rotor.

* * * * *